United States Patent
Zilberstein et al.

(10) Patent No.: US 11,842,069 B2
(45) Date of Patent: Dec. 12, 2023

(54) STORAGE SYSTEM AND METHOD FOR DELAYING FLUSHING OF A WRITE BUFFER BASED ON A HOST-PROVIDED THRESHOLD

(71) Applicant: Western Digital Technologies, Inc., San Jose, CA (US)

(72) Inventors: Einav Zilberstein, Had Hasharon (IL); Hadas Oshinsky, Kfar Saba (IL); Maayan Suliman, Had Hasharon (IL)

(73) Assignee: Western Digital Technologies, Inc., San Jose, CA (US)

( * ) Notice: Subject to any disclaimer, the term of this patent is extended or adjusted under 35 U.S.C. 154(b) by 163 days.

(21) Appl. No.: 17/592,814

(22) Filed: Feb. 4, 2022

(65) Prior Publication Data
US 2023/0229347 A1 Jul. 20, 2023

Related U.S. Application Data

(60) Provisional application No. 63/299,595, filed on Jan. 14, 2022.

(51) Int. Cl.
*G06F 3/06* (2006.01)

(52) U.S. Cl.
CPC ............ *G06F 3/0656* (2013.01); *G06F 3/064* (2013.01); *G06F 3/0604* (2013.01); *G06F 3/0631* (2013.01); *G06F 3/0659* (2013.01); *G06F 3/0679* (2013.01)

(58) Field of Classification Search
CPC .... G06F 3/0656; G06F 3/0604; G06F 3/0631; G06F 3/064; G06F 3/0659; G06F 3/0679
See application file for complete search history.

(56) References Cited

U.S. PATENT DOCUMENTS

| | | | |
|---|---|---|---|
| 9,645,752 B1 | 5/2017 | Obr | |
| 2014/0379990 A1 | 12/2014 | Pan | |
| 2017/0075812 A1* | 3/2017 | Wu | G06F 12/0868 |
| 2018/0322051 A1* | 11/2018 | Heller | G06F 12/0868 |
| 2019/0026226 A1 | 1/2019 | Boyd | |
| 2019/0171392 A1* | 6/2019 | Kim | G06F 13/1673 |
| 2020/0026646 A1* | 1/2020 | Lee | G11C 11/5628 |
| 2020/0034299 A1 | 1/2020 | Lee | |
| 2020/0104048 A1 | 4/2020 | Habbinga | |

(Continued)

OTHER PUBLICATIONS

Udin, Efe; "UFS 2.2 Standard is Official: Uses a New Feature Called Writebooster"; Gizchina Chinese Gadget Reviews; Aug. 19, 2020; downloaded from the Internet at https://www.gizchina.com/2020/08/19/ufs-2-2-standard-is-official-uses-a-new-feature-called-writebooster/ on Jan. 11, 2021; 8 pages.

(Continued)

*Primary Examiner* — Tracy C Chan
(74) *Attorney, Agent, or Firm* — Crowell & Moring LLP

(57) ABSTRACT

A storage system allocates single-level cell (SLC) blocks in its memory to act as a write buffer. A host sends the storage system a threshold indicating an amount of data that should be stored in the write buffer before the storage system flushes the write buffer to multi-level cell (MLC) blocks in the memory. Using this threshold can extend the amount of time that data is maintained in the write buffer, which can reduce the write-amplification factor and power consumption, as well as increase read performance of the data.

21 Claims, 10 Drawing Sheets

(56) References Cited

U.S. PATENT DOCUMENTS

| | | | |
|---|---|---|---|
| 2021/0056016 A1 | 2/2021 | Bulusu | |
| 2021/0342094 A1 | 11/2021 | Liu | |
| 2022/0075553 A1* | 3/2022 | Um | G06F 3/0679 |
| 2022/0091984 A1 | 3/2022 | Das | |
| 2022/0261174 A1 | 8/2022 | Igahara | |
| 2023/0068214 A1 | 3/2023 | Inglis | |
| 2023/0143181 A1* | 5/2023 | Tan | G06F 3/0656 |
| | | | 711/103 |
| 2023/0195370 A1* | 6/2023 | Porzio | G06F 3/0625 |
| | | | 711/154 |

OTHER PUBLICATIONS

Vasan, G.S.; "UFS 3.1 vs UFS 3.0 Comparison: What's New and Different?"; Smartprix.com; Dec. 29, 2020; downloaded from the Internet at https://www.smartprix.com/bytes/ufs-3-1-vs-ufs-3-0-comparison-new-features/ on Jan. 11, 2021; 6 pages.

* cited by examiner

| | Usage Case #1 (SW invalidations) | |
|---|---|---|
| 30 Loops ~15K MB | Delayed Flush (200 MB Threshold) | Delayed Flush (1 GB threshold) |
| TLC WAF | >0 | 0 |
| SLC → TLC Payload | 1,000's of MB | 0 |
| Total Power Energy | X mWh | ~20-30% X mWh |

FIG. 6

| 30 Loops ~15K MB | Usage Case #2 (SW Fill up) | | |
|---|---|---|---|
| | Default Flush (200 MB Threshold) | Delayed Flush (1 GB Threshold) | Delayed Flush (Max Write Buffer Size Threshold) |
| Write Buffer Available Size | >= 1 GB | >= 1 GB | Fill Up Until 0% (Write Buffer is Full) |
| Benchmark Performance After Usage Case | SLC Performance | SLC Performance | TLC Performance |

FIG. 8

STORAGE SYSTEM AND METHOD FOR DELAYING FLUSHING OF A WRITE BUFFER BASED ON A HOST-PROVIDED THRESHOLD

CROSS-REFERENCE TO RELATED APPLICATION

This application claims the benefit of U.S. Provisional Patent Application No. 63/299,595, filed Jan. 14, 2022, which is hereby incorporated by reference.

BACKGROUND

In order to save cost, a storage system can store data in multi-level cell (MLC) (e.g., triple-level cell (TLC) or quad-level cell (QLC)) blocks in its memory instead of single-level cell (SLC) blocks. However, SLC blocks typically have a faster write speed. To improve write performance, some storage systems use SLC blocks as a write buffer, where data is initially stored in the write buffer and later flushed to MLC blocks in the memory.

BRIEF DESCRIPTION OF THE DRAWINGS

FIG. 6 is a chart illustrating advantages of an embodiment that delays flushing of a write buffer based on a host-provided threshold.

FIG. 8 is a chart illustrating advantages of an embodiment that delays flushing of a write buffer based on a host-provided threshold.

DETAILED DESCRIPTION

The following embodiments generally relate to a storage system and method for delaying flushing of a write buffer based on a host-provided threshold. In one embodiment, a storage system is presented comprising a memory and a controller. The controller is configured to create a write buffer allocated from single-level cell (SLC) blocks in the memory; receive, from a host, a threshold indicating how much data can be stored in the write buffer before flushing at least some data stored in the write buffer to multi-level cell (MLC) blocks in the memory; determine whether an amount of data stored in the write buffer exceeds the threshold; and in response to determining that the amount of data stored in the write buffer exceeds the threshold, flush enough data from the write buffer to the MLC blocks in the memory so that the amount of data stored in the write buffer does not exceed the threshold.

In another embodiment, a method is provided that is performed in a host in communication with a storage system comprising a memory, wherein the memory comprises a first set of blocks allocated as a write buffer and a second set of blocks, wherein the first set of blocks has a lower latency than the second set of blocks. The method comprises: determining a threshold amount of data that should be maintained in the write buffer before the storage system flushes the write buffer to the second set of blocks in the memory; and informing the storage system of the threshold amount.

In yet another embodiment, a storage system is provided comprises a memory; means for creating a write buffer allocated from single-level cell (SLC) blocks in the memory; means for receiving, from a host, a threshold indicating how much data can be stored in the write buffer before flushing at least some data stored in the write buffer to multi-level cell (MLC) blocks in the memory; means for determining whether an amount of data stored in the write buffer exceeds the threshold; and means for, in response to determining that the amount of data stored in the write buffer exceeds the threshold, flushing enough data from the write buffer to the MLC blocks in the memory so that the amount of data stored in the write buffer does not exceed the threshold. Other embodiments are provided and can be used alone or in combination.

Figure 1A:
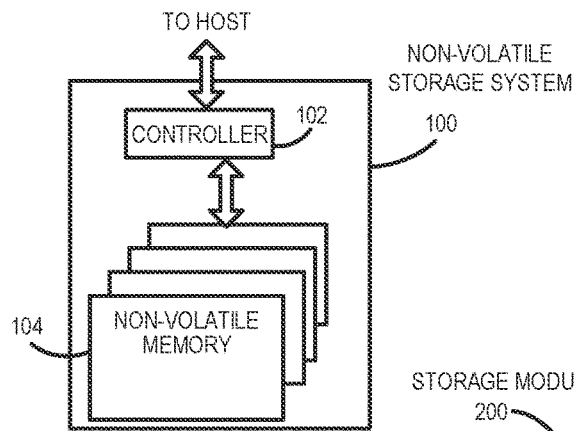
FIG. 1A is a block diagram of a non-volatile storage system of an embodiment.
Figure 1B:
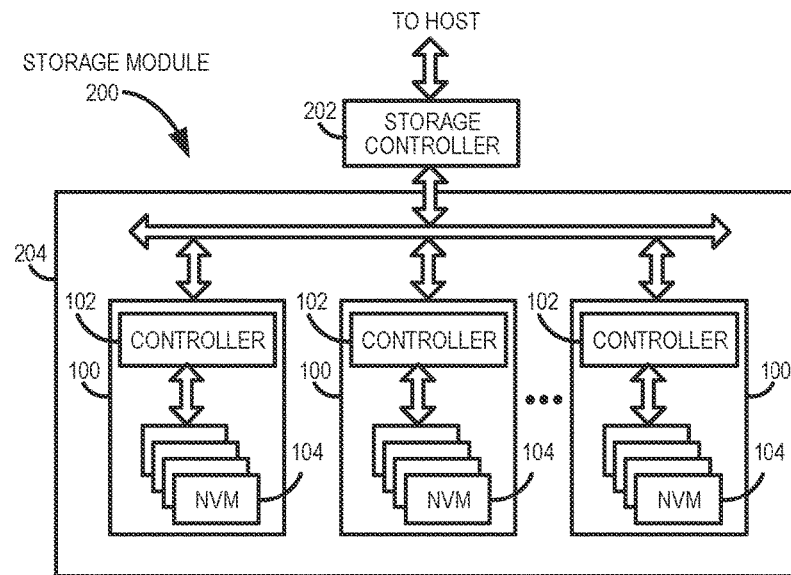
FIG. 1B is a block diagram illustrating a storage module of an embodiment.
Figure 1C:
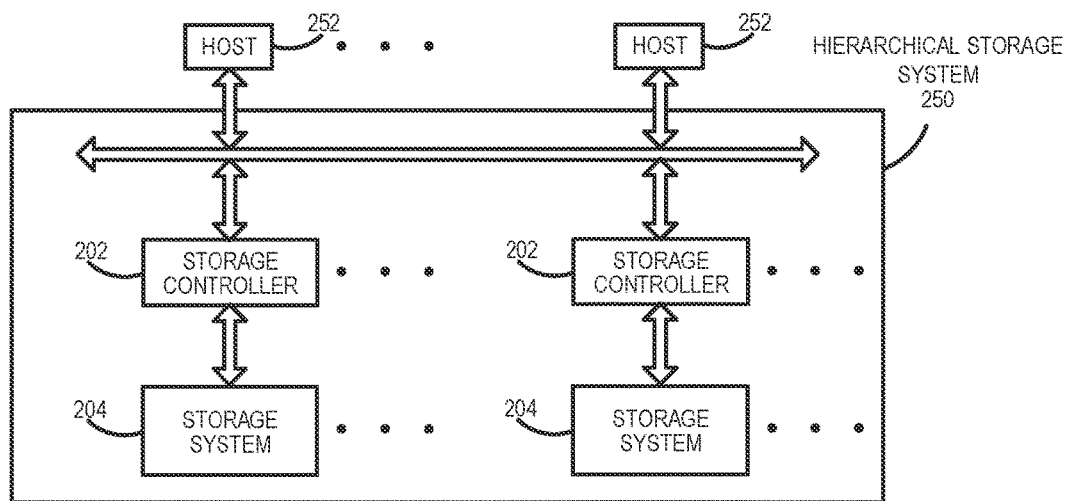
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
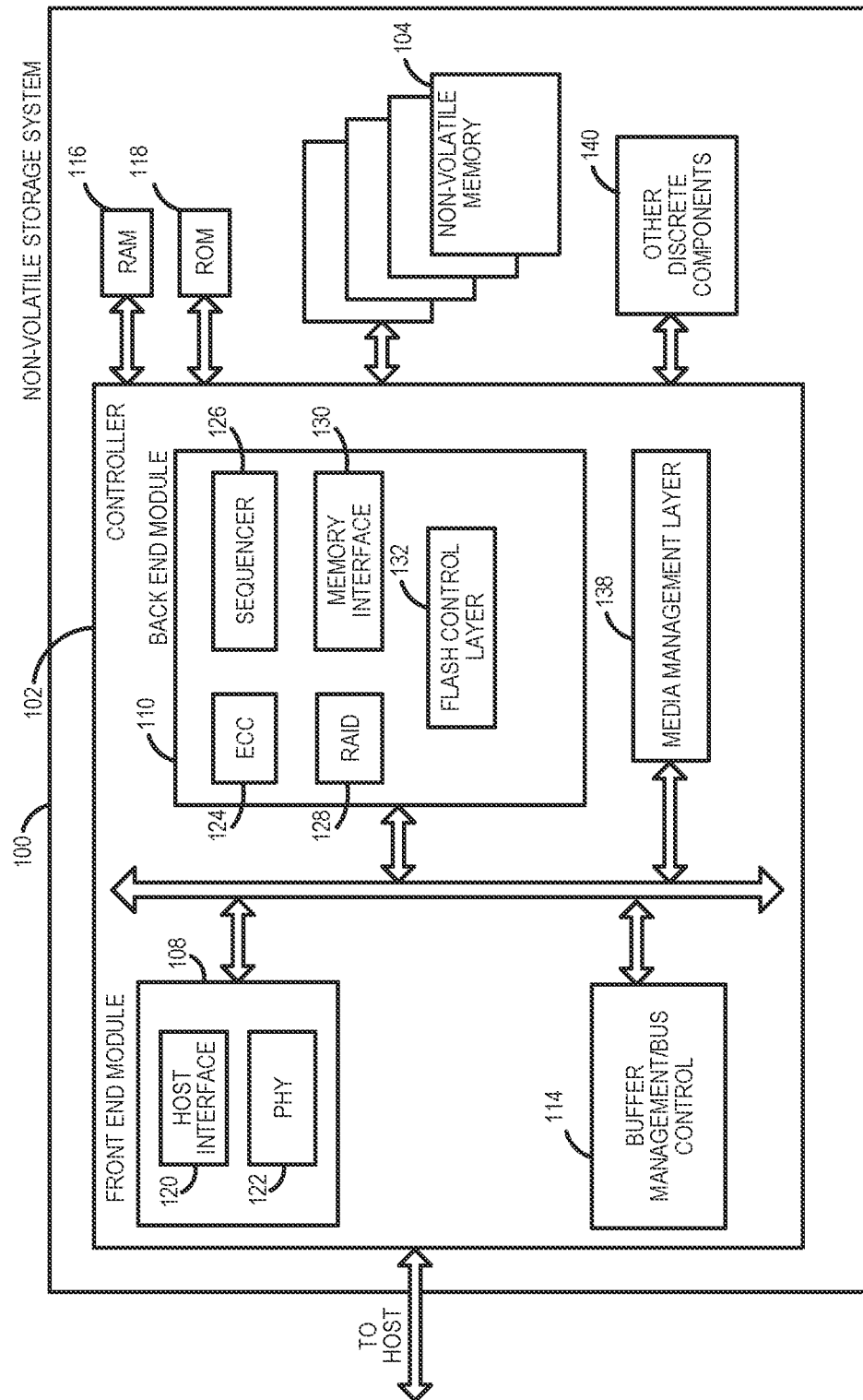
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
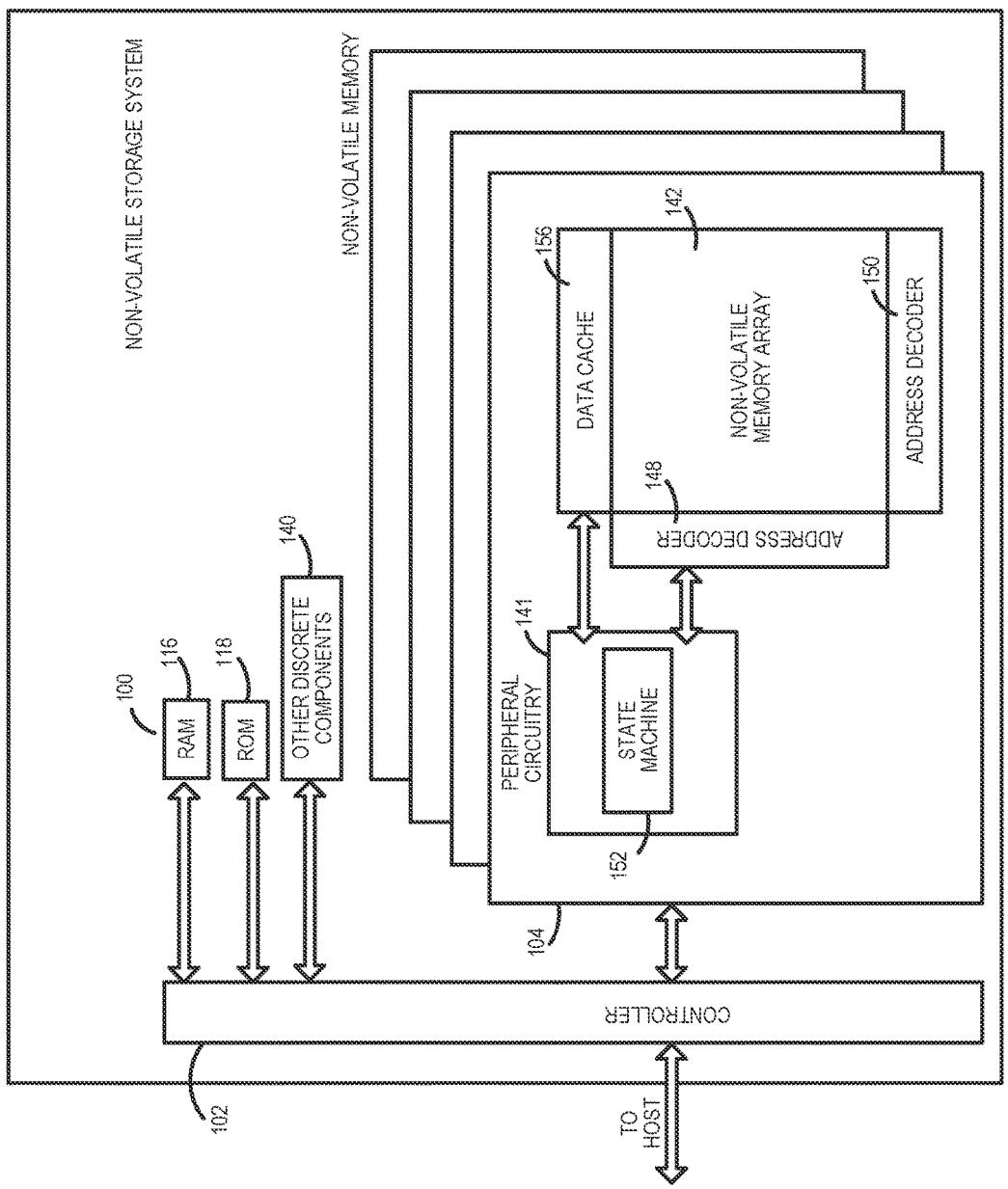
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
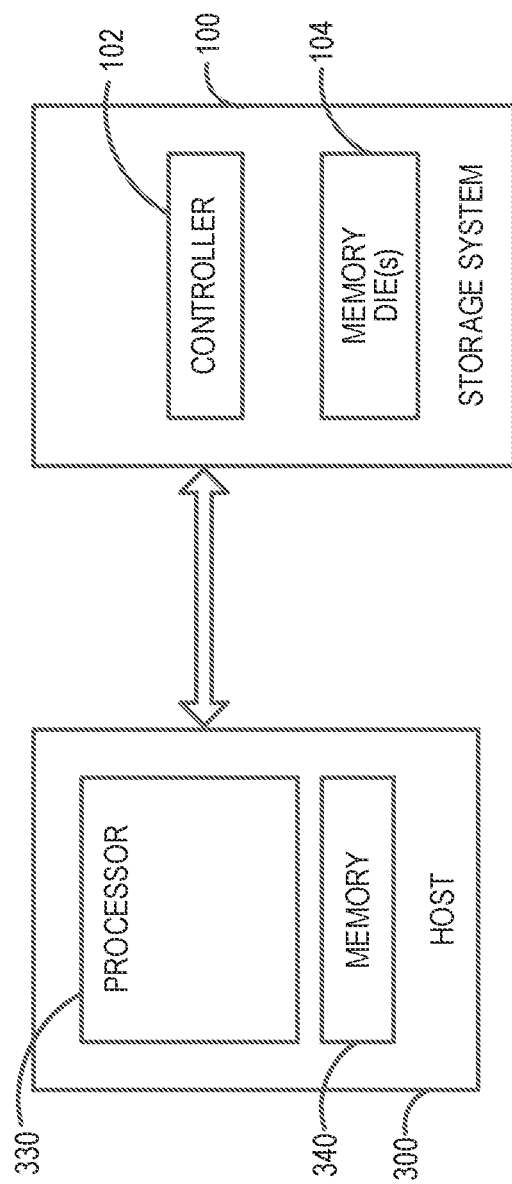
FIG. 3 is a diagram of a host and a storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340) to the storage system 100 for storage in the storage system's memory 104.

As described above, in order to save cost, a storage system can store data in multi-level cell (MLC) (e.g., triple-level cell (TLC) or quad-level cell (QLC)) blocks in its memory instead of single-level cell (SLC) blocks. However, SLC blocks typically have a faster write speed. To improve write performance, some storage systems use SLC blocks as a write buffer, where data is initially stored in the write buffer and later flushed to MLC blocks in the memory. For example, the WriteBooster™ feature in the Universal Flash Storage (UFS) standard creates an SLC cache in flash memory that can be used to improve write speed and provide high performance for host bursts.

Reading data from MLC blocks may be slower than reading data from SLC blocks, and, at certain times, a host may require improved read performance (e.g., low latency/high bandwidth) for specific data/files. To improve read latency/performance in such situations, some storage systems delay copying some of the data to MLC blocks (thereby keeping that data in SLC blocks) in an attempt to accelerate read performance or latency later on. However, this approach to accelerating reads is limited to recently-written data. Other storage systems reduce read latency by addressing different execution aspects that contribute to processing latency.

Since the write buffer may become a bottleneck if it is not evacuated fast enough, the storage system can be configured to fold the SLC data stored in the write buffer as fast as possible, and the host can make sure that flush is always enabled. However, in some host application cases, this operation can result in sub-optimal read performance, power waste, and excessive write amplification on the MLC blocks. These sub-optimal behaviors are due to early evacuation of the data from the write buffer.

Consider, for example, the situation in which there are high-frequency reads from a game just installed on the host. With the current write buffer behavior, the game files would be flushed very fast to the MLC blocks, and read performance would be of MLC reads instead of the more-optimized SLC reads. Another example is re-writing temporary data to the memory. For example, certain applications may store a temporary zip file in the memory during installation, and this zip file may no longer be needed or used once the zip file is opened. Moving a temporary file that is soon to be discarded or re-written to the MLC blocks will result in unnecessary waste of storage energy and cause excessive writes to the MLC blocks, which are more limited in programming/erase cycles and endurance capabilities then the SLC blocks.

If the write buffer is managed by the storage system, a possible solution to this problem can be for the storage system to use an evacuation policy in which the last-written data remains longer in the write buffer (e.g., the last 200 megabytes up to one gigabyte may be retained longer in the SLC write buffer). However, this approach does not allow the host to control the mechanism and define the desired storage behavior per the system needs of lifetime, phone battery conditions, typical pattern, or other factors. If the write buffer is managed by the host, a possible solution to this problem is for the host to disable the flush command during certain periods of times. This would result in keeping the last-written data in the write buffer until the flush command is enabled again by the host. However, in this approach, the host cannot specifically control the SLC buffer fullness, and a very fast buffer can get to a 100% fullness condition quickly, resulting in a severe performance drop being experienced by the host. The host may want to control flush disable/enable by prompt monitoring of the write booster buffer fullness, but that can result in continuous host queries/polling, which can interfere with the system getting into proper idle and energy saving modes.

The following embodiments can be used to overcome these problems, while reducing the write-amplification factor (WAF) and improving energy and performance. In general, in these embodiments, the host 300 provides the storage system 100 with a threshold indicating how much data can be stored in an SLC write buffer before flushing at least some data stored in the write buffer to MLC blocks in the memory 104 (e.g., the least-recently-written data, although other data can be flushed instead). When the amount of data stored in the write buffer exceeds the threshold, the controller 102 flushes enough data from the write buffer to the MLC blocks in the memory 104 so that the amount of data stored in the write buffer does not exceed the threshold.

The following paragraphs describe one example implementation of an embodiment. It should be understood that this is merely an example and that other implementations can be used. So, the details discussed below should not be read into the claims unless expressly recited therein. For instance, while the below example describes data being flushed from an SLC write buffer to MLC blocks, more generally, data can be flushed from a first set of blocks to a second set of blocks, where the first set of blocks has a lower latency than the second set of blocks.

Figure 4:
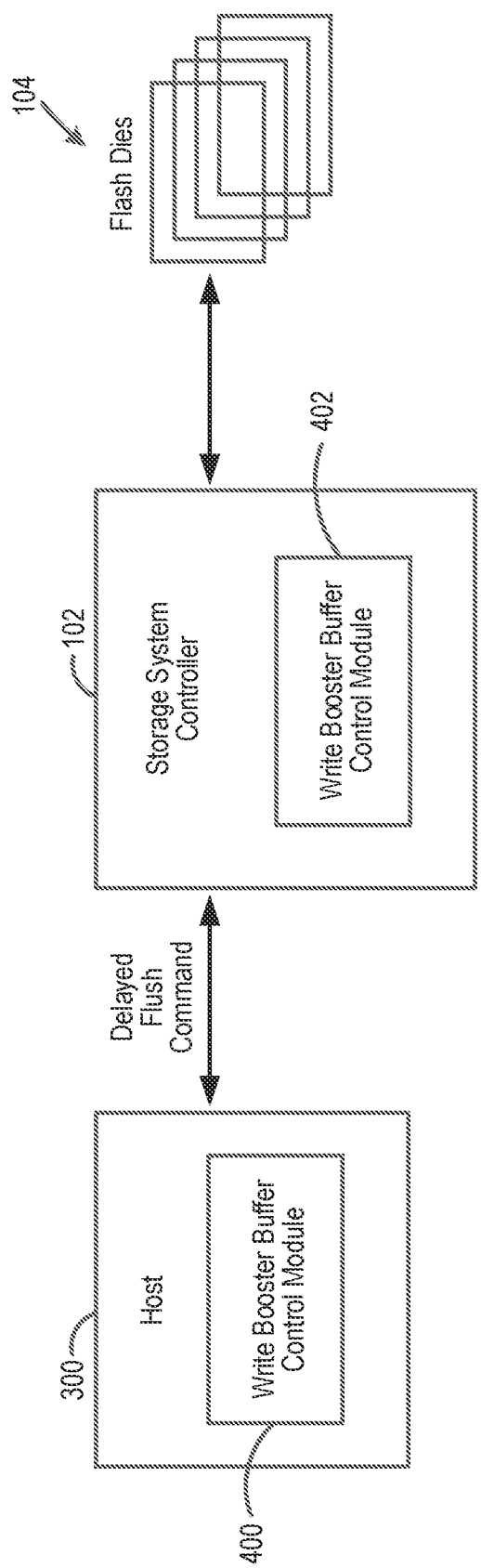
FIG. 4 is a diagram of a host, storage system controller, and memory of an embodiment.

Turning again to the drawings, FIG. 4 is a diagram showing the host 300, storage system controller 102, and the memory 104. As shown in FIG. 4, in this embodiment, the host 300 and storage system controller 102 have respective write booster buffer control modules 400, 402 that can be used to allow the host 300 to dynamically control the amount of data flushed from the write booster buffer, thereby optimizing WAF, power, and read latency—all without requiring the use of complex algorithms and specific pattern awareness applications.

In this example, the threshold of how much data to keep in the mite booster buffer is set by the host 300 via a dedicated delayed flush command and can vary from 0 megabytes (MB) (meaning avoid keeping any last data written in write booster) to a maximum size supported by the storage system 100, which can be less than a maximum size of the write booster buffer). The larger the X MB threshold is, the more potential improvement of WAF, power, and read performance is expected, as, statistically, more data will reside in the write booster buffer until it gets erased, re-written, or read again. However, a larger X MB threshold will also result in more occurrences of a full write booster buffer (as less data is being flushed) and, under some scenarios, it may be at the expense of SLC write performance experienced by the host 300 (as the write booster buffer will not be available for host writes).

in some embodiments, the controller 102 of the storage system 100 can inform the host 300 (e.g., via attribute(s)) of the storage system's support of the delayed flush command, the maximum amount of data that can be set by the host 300 as the threshold of the delayed flush command (the write booster's current and available buffer can reflect the space consumed in the buffer due to the configurable threshold), and/or a recommendation for a delayed flush threshold (e.g., based on internal lifetime, fullness statistics, and patterns statistics captured by the controller 102).

In operation, the host 300 sends the dedicated delayed flush command that sets the threshold of data to be maintained in the write buffer. In this example, the threshold specifies that the last X MB of data written is to be kept in the buffer. In response, the controller 102 flushes the write booster only when the buffer fullness exceeds the threshold of X MB and stops the flush once buffer fullness is below or equal to X MB. When new data is written again by the host 300, the write booster buffer may exceed again the X MB threshold, and the controller 102 resumes the flushing of the oldest data in the buffer until the write booster fullness once again is below the threshold. The dedicated delayed flush command can be sent many times during the storage lifetime, and the host 300 can change the threshold dynamically in each command.

In one embodiment, the host 300 can apply simple learning techniques of the pattern and system behavior and update or modify the delayed flush threshold per need accordingly. In one example, the host 300 can set a very low threshold at the beginning of the lifetime of the storage system 100 and then increase this threshold as the storage system's lifetime progress. In another example, the host 300 can set this threshold to a higher value based on various factors, such as, but not limited to, the host's (e.g., phone's) battery condition. In another example, the threshold can be set to an initial high value, which decreases gradually upon statistics showing the number of occurrences where the write buffer was completely full. In yet another example, the threshold can be set based on media fullness conditions in which write buffer availability is more critical for the SLC performance guarantee.

Figure 5:
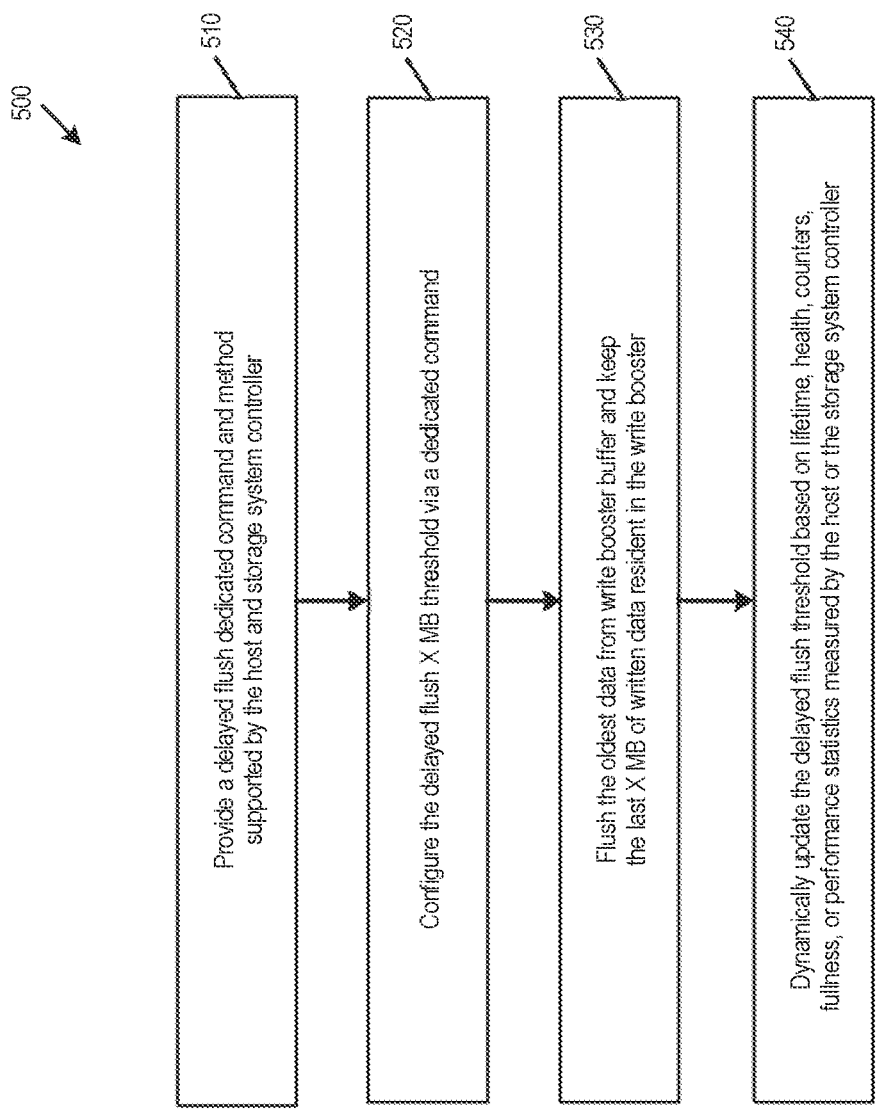
FIG. 5 is a flow chart of a method of an embodiment for delaying flushing of a write buffer based on a host-provided threshold.

Turning again to the drawings, FIG. 5 is a flow chart 500 of a method of an embodiment for delaying flushing of a write buffer based on a host-provided threshold. As shown in FIG. 5, this method provides a delayed flush dedicated command and method supported by the host and the controller 102 (act 510). More specifically, the host 300 configures a delayed flush X megabyte (MB) threshold and provides it to the storage system 100 (e.g., via a dedicated command) (act 520). In response, the storage system controller 102 flushes the oldest data from write booster buffer, keeping the last X MB of written data resident in the write booster (act 530). The host 300 can dynamically update the delayed flush threshold based on a number of conditions, such as, but not limited to, lifetime, health, counters, fullness, or performance statistics measured by the host 300 and/or storage system 100 (act 510).

Figure 7:
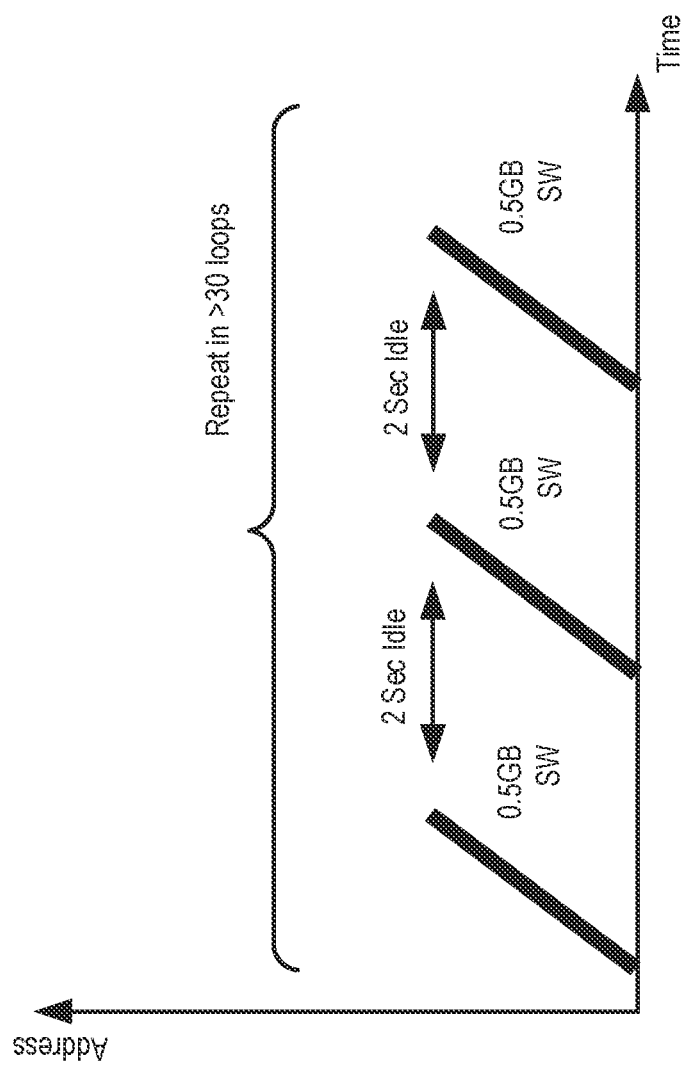
FIG. 7 is a graph illustrating advantages of an embodiment that delays flushing of a write buffer based on a host-provided threshold.
Figure 9:
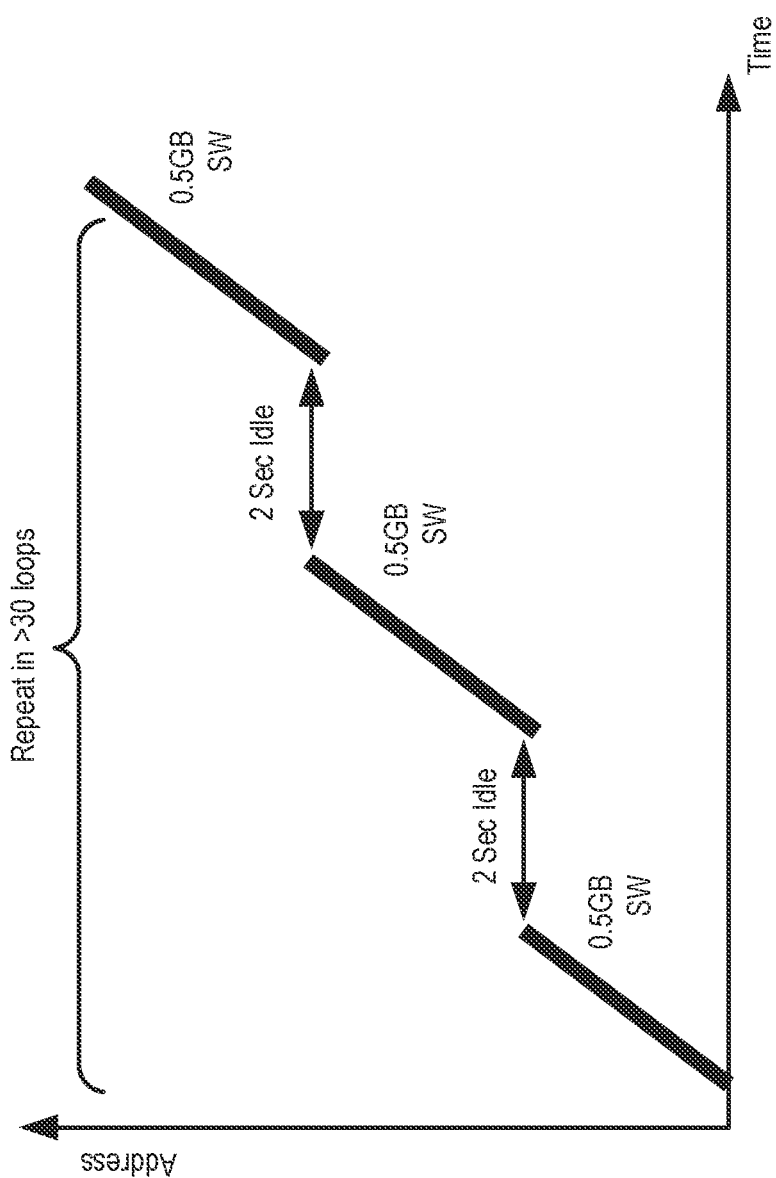
FIG. 9 is a graph illustrating advantages of an embodiment that delays flushing of a write buffer based on a host-provided threshold.

FIGS. 6 and 7 are a chart and graph, respectively, that show a model simulation for a specific use case example where the same 0.5 GB file is re-written in a loop. This chart and graph show energy and WAF optimization when the delayed flush value is configured to a relatively high value (1 GB vs. 200 MB threshold). Further, FIGS. 8 and 9 are a chart and graph, respectively, that show a model simulation for a specific use case example of software (SW) filling up the storage system 100. This chart, and graph show the write booster buffer condition and performance tradeoff when setting the delayed flush threshold to higher than a recommended size.

There are several advantages associated with these embodiments. For example, these embodiments can be used to improve the read latency, energy, and lifetime of the storage system 100 by optimizing the write booster buffer flush operation. More specifically, these embodiments can provide energy savings and better write amplification by statistically reducing the flushing of data that will soon be re-written or discarded while still keeping the capability of the storage system 100 to absorb new write bursts with SLC performance.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
   a memory; and
   a controller configured to:
   create a write buffer allocated from single-level cell (SLC) blocks in the memory;
   inform a host, that the storage system supports a dedicated delayed flush command;
   receive, from the host, the dedicated delayed flush command, which specifies a threshold indicating how much data can be stored in the write buffer before flushing at least some data stored in the write buffer to multi-level cell (MLC) blocks in the memory;
   determine whether an amount of data stored in the write buffer exceeds the threshold; and
   in response to determining that the amount of data stored in the write buffer exceeds the threshold, flush enough data from the write buffer to the MLC blocks in the memory so that the amount of data stored in the write buffer does not exceed the threshold.

2. The storage system of claim 1, wherein the data flushed from the write buffer is least-recently-written data.

3. The storage system of claim 1, wherein the controller is further configured to inform the host of a maximum allowable size of the threshold.

4. The storage system of claim 1, wherein the controller is further configured to inform the host of a recommended threshold.

5. The storage system of claim 4, wherein the recommended threshold is based on storage system lifetime.

6. The storage system of claim 4, wherein the recommended threshold is based on memory health.

7. The storage system of claim 4, wherein the recommended threshold is based on a counter value.

8. The storage system of claim 4, wherein the recommended threshold is based on a memory fullness statistic.

9. The storage system of claim 4, wherein the recommended threshold is based on a memory pattern statistic.

10. The storage system of claim 1, wherein the controller is further configured to receive an updated threshold from the host.

11. The storage system of claim 1, wherein the memory comprises a three-dimensional memory.

12. In a host in communication with a storage system comprising a memory, wherein the memory comprises a first set of blocks allocated as a write buffer and a second set of blocks, wherein the first set of blocks has a lower latency than the second set of blocks, a method comprising:
   receiving an indication from the storage system of a maximum allowable threshold size;
   determining a threshold amount of data that should be maintained in the write buffer before the storage system flushes the write buffer to the second set of blocks in the memory; and
   informing the storage system of the threshold amount.

13. The method of claim 12, further comprising informing the storage system to flush least-recently-written data from the write buffer in response to an actual amount of data stored in the write buffer exceeding the threshold.

14. The method of claim 12, wherein the host informs the storage system of the threshold amount via a dedicated delayed flush command.

15. The method of claim 14, further comprising receiving an indication from the storage system that the storage system supports the dedicated delayed flush command.

16. The method of claim 12, further comprising receiving an indication from the host of a recommended threshold.

17. The method of claim 12, wherein the threshold amount is determined based on information received from the storage system.

18. The method of claim 17, wherein the information received from the storage system comprises one or more of the following: storage system lifetime, memory health, a counter value, a memory fullness statistic, and a memory pattern statistic.

19. The method of claim 12, further comprising dynamically changing the threshold amount of data.

20. The method of claim 12, wherein the first set of blocks comprises single-level cell (SLC) blocks and the second set of blocks comprises multi-level cell (MLC) blocks.

21. A storage system comprising:
   a memory;
   means for creating a write buffer allocated from single-level cell (SLC) blocks in the memory;
   means for informing a host of a recommended threshold;
   means for receiving, from the host, a threshold indicating how much data can be stored in the write buffer before flushing at least some data stored in the write buffer to multi-level cell (MLC) blocks in the memory;
   means for determining whether an amount of data stored in the write buffer exceeds the threshold; and
   means for flushing enough data from the write buffer to the MLC blocks in the memory so that the amount of data stored in the write buffer does not exceed the threshold in response to determining that the amount of data stored in the write buffer exceeds the threshold.

* * * * *